(12) United States Patent
Jernej et al.

(10) Patent No.: US 11,305,664 B2
(45) Date of Patent: Apr. 19, 2022

(54) GROUND CONTACT UNIT FOR A VEHICLE BATTERY CHARGING SYSTEM AND METHOD FOR SWITCHING A CONTACT AREA OF A GROUND CONTACT UNIT

(71) Applicant: Easelink GmbH, Graz (AT)

(72) Inventors: Guenther Jernej, Graz (AT); Manuel Leibetseder, Graz (AT)

(73) Assignee: Easelink GmbH, Graz (AT)

( * ) Notice: Subject to any disclaimer, the term of this patent is extended or adjusted under 35 U.S.C. 154(b) by 146 days.

(21) Appl. No.: 16/757,197

(22) PCT Filed: Oct. 8, 2018

(86) PCT No.: PCT/EP2018/077304
§ 371 (c)(1),
(2) Date: May 20, 2020

(87) PCT Pub. No.: WO2019/076663
PCT Pub. Date: Apr. 25, 2019

(65) Prior Publication Data
US 2021/0122256 A1 Apr. 29, 2021

(30) Foreign Application Priority Data

Oct. 17, 2017 (DE) .................. 10 2017 124 195.7
May 24, 2018 (DE) .................. 10 2018 112 472.4

(51) Int. Cl.
*B60L 53/60* (2019.01)
*B60L 53/35* (2019.01)
(Continued)

(52) U.S. Cl.
CPC ............. *B60L 53/60* (2019.02); *B60L 53/16* (2019.02); *B60L 53/35* (2019.02); *H01R 13/642* (2013.01);
(Continued)

(58) Field of Classification Search
CPC .......... B60L 53/60; B60L 53/35; B60L 53/16; H01R 13/642; H01R 2201/26; H02J 7/0045
(Continued)

(56) References Cited

U.S. PATENT DOCUMENTS

| 5,139,960 A | * | 8/1992 | Chadi | H01L 21/02395 |
| | | | | 438/518 |
| 2013/0270514 A1 | * | 10/2013 | Saxler | H01L 33/08 |
| | | | | 257/13 |
| 2016/0006260 A1 | | 1/2016 | Nakamura et al. | |

FOREIGN PATENT DOCUMENTS

| CN | 1433579 A | * 11/2000 | |
| CN | 111344186 A | * 6/2020 | .............. H04B 3/56 |

(Continued)

OTHER PUBLICATIONS

Von Peter Rust., LED-Displays: Matrixtreiber-Topologien unter der Lupe, Design & Elektronik, Retrieved from the Internet: https://www.elektroniknet.de/design-elektronik/optoelektronik/matrixtreiber-topologien-unter-der-lupe-96453.html, Apr. 4, 2013.

*Primary Examiner* — Suresh Memula
(74) *Attorney, Agent, or Firm* — Dilworth IP, LLC

(57) ABSTRACT

A ground contact unit for a vehicle battery charging system comprises a base body, at least one potential layer, a plurality of contact areas, a plurality of switching units and a plurality of switching lines by means of which the switching units can be actuated, wherein a plurality of switching units are provided on each of the switching lines. The switching lines are subdivided into at least two groups, and each of the switching units is provided on at least two switching lines from at least two different groups, so that the switching state of the switching unit depends on the signal state on its associated switching lines. Each switching unit is coupled to at least one contact area such that the switching unit can electrically connect and interrupt the corresponding at least one contact area to the at least one potential layer assigned to the contact area.

A method of switching a contact area is also shown.

20 Claims, 9 Drawing Sheets

(51) Int. Cl.
*B60L 53/16* (2019.01)
*H01R 13/642* (2006.01)
*H02J 7/00* (2006.01)

(52) U.S. Cl.
CPC ........ *H02J 7/0045* (2013.01); *H01R 2201/26* (2013.01)

(58) Field of Classification Search
USPC .......................................................... 320/109
See application file for complete search history.

(56) References Cited

FOREIGN PATENT DOCUMENTS

| | | | | |
|---|---|---|---|---|
| DE | 102014100493 A1 | 7/2015 | | |
| DE | 102018112472 A1 * | 4/2019 | ............. | B60L 53/16 |
| DE | 102019213055 A1 * | 3/2021 | ............. | B60L 53/30 |
| EP | 0371684 A2 * | 11/1989 | | |
| GB | 2584324 A * | 12/2020 | ............. | B60K 35/00 |
| WO | 2015162832 A1 | 10/2015 | | |
| WO | 2017161394 A1 | 9/2017 | | |
| WO | 2017161395 A1 | 9/2017 | | |
| WO | WO-2019052961 A1 * | 3/2019 | ............. | B60L 53/14 |
| WO | WO-2019052962 A1 * | 3/2019 | ............. | B60L 53/35 |
| WO | WO-2019086634 A1 * | 5/2019 | | |
| WO | WO-2020240198 A1 * | 12/2020 | ............. | B64D 37/30 |

* cited by examiner a)

b)

GROUND CONTACT UNIT FOR A VEHICLE BATTERY CHARGING SYSTEM AND METHOD FOR SWITCHING A CONTACT AREA OF A GROUND CONTACT UNIT

FIELD OF THE DISCLOSURE

In electrically driven vehicles such as plug-in hybrid vehicles and pure electric vehicles, the batteries of the vehicles must be charged regularly, preferably after each trip. To this end, the vehicle is connected to a current source, such as the local electrical grid, using a vehicle coupling system. It is possible to use a connector such as the Type 2 connector, which must be inserted manually by a person into the corresponding socket of the vehicle.

BACKGROUND

Vehicle coupling systems for vehicle battery charging systems having a contact unit of the power connection provided on the ground are for example known. This ground contact unit arranged on the ground is physically contacted by means of a movable vehicle contact unit which can move downwards from the underbody of the vehicle. This enables the vehicle to be electrically connected to the local electrical grid.

It is necessary that the electrodes provided on the vehicle contact unit come physically into contact with contact surfaces of the ground contact unit. For this purpose, the vehicle contact unit must not only be positioned above the ground contact unit when the vehicle is parked, but the correct electrodes of the vehicle contact unit must also be placed on the corresponding contact surfaces of the ground contact unit and must be switched accordingly, as the electrodes or contact surfaces have different functions. It is important that only contact surfaces of the ground contact unit located in the area of the vehicle contact unit are supplied with current, so that no exposed, current-supplied contact surfaces are present.

SUMMARY

Thus, there is a need to provide a simply structured and low-cost ground contact unit for an automatic vehicle battery charging system and a method of switching a contact area of a ground contact unit by means of which a physical electrical connection between a vehicle contact unit and a ground contact unit is enabled in an automatic manner and without of faulty contacts.

The object is achieved by a ground contact unit for a vehicle battery charging system for automatic conductive connection of the ground contact unit and a vehicle contact unit, having a plate-shaped base body, at least one potential layer, a plurality of contact areas which are arranged on an exposed charging surface of the base body and are assigned to at least one potential layer, a plurality of switching units and a plurality of switching lines by means of which the switching units can be actuated, a plurality of switching units being provided on each of the switching lines, wherein the switching lines are subdivided into at least two groups each having a plurality of switching lines, and each of the switching units is provided on at least two switching lines from at least two different groups, in particular on one switching line of each group, such that the switching state of the switching unit depends on the signal state on its associated switching lines, wherein each switching unit is coupled to at least one of the contact areas such that the switching unit can electrically connect and interrupt the corresponding at least one contact area to the at least one potential layer assigned to the contact area.

The exposed charging area of the base body is configured such that the vehicle contact unit can be placed into contact or comes into contact therewith.

As the switching lines are subdivided into groups and the switching units are connected to switching lines of the different groups, it is possible to dispense with the provision of an individual electrical drive switch for each switching unit or at least of an individual output of the control unit (microcontroller) of the ground contact unit having its own direct cabling. Rather, an electrical drive switch is now required only for each switching line, as a result of which the number of electrical drive switches and cabling required can be drastically reduced without having to accept any loss of functionality of the ground contact unit. In other words, due to the disclosure, it is not required to have two lines and at least one output of the microcontroller of the ground contact unit for each switching unit. Therefore, the ground contact unit has a simple structure and can be manufactured in a cost-effective manner.

The switching units may include electromechanical switches—such as relays—, electronic switches—such as field effect transistors (e.g. MOSFET) or TRIAC (Triode for Alternating Current)—and/or other logic switches.

If the switching units include electronic switches, e.g. TRIAC or field effect transistors, the switching units may also each have an upstream circuit via which the electronic switch is connected to the switching lines.

For example, the upstream circuits generate an output signal to the electronic switch based on the signals of the switching lines, the output signal switching the corresponding electronic switch. The upstream circuits are for example AND gates or NAND gates.

For a flexible use of the contact areas, the at least one potential layer can be connected to the earth potential, a neutral conductor, an outer conductor or phase, a positive pole or a negative pole of a current source, in particular of a local electrical grid, in particular wherein a separate potential layer is respectively present for the earth potential, the neutral conductor, an outer conductor or phase, a positive pole and/or a negative pole of a current source.

In the context of this disclosure, the obsolete term "phase" is used for an outer conductor for simplification.

In addition, for the sake of simplification, the term potential layer is also used for those layers which are connected to the outer conductors or the phase, although these layers do not have a constant electrical potential, but have their potential changing periodically with the potential of the corresponding outer conductor.

Preferably, the switching lines can be supplied with voltage and/or current separately from each other, which allows the switching units to be switched in a purposeful and effective manner.

For example, the ground contact unit has at least one PE layer, wherein the switching units are set up such that they can electrically connect the contact area assigned thereto either to the potential layer assigned thereto or to the at least one PE layer. This ensures that no current-carrying and/or voltage-carrying contact area is exposed when the corresponding contact area or the entire ground contact unit is not used. In particular, the PE layers are at earth potential.

Alternatively or additionally, the ground contact unit can have PE contact areas which are permanently connected to the at least one PE layer.

Preferably, exactly one switching unit is provided for each contact area, in particular which is not a PE contact area, thus achieving a particularly flexible and cost-effective structure.

In order to change the potential of a contact area in a simple manner, a switching element of the switching unit can electrically connect the corresponding at least one contact area to the potential layer assigned thereto if the switching lines assigned to the switching unit are switched appropriately, in particular in a common electric circuit having correct polarity.

Preferably, the switching lines on which one of the switching units is provided differ from the switching lines on which another of the switching units is provided in at least one switching line. In this way, a clear driving of the switching units is possible.

In other words, the individual switching units are driven by a combination of at least two switching lines, each switching unit being adapted to be actuated by a determined combination of switching lines, or only one switching unit being assigned to each combination of switching lines.

For example, only one switching line per group is provided for each switching unit and coupled thereto.

In one configuration of the disclosure, the switching lines of a group run essentially in the same direction, in particular parallel, and/or the switching lines form a lattice at the points of intersection of which switching lines of different groups intersect, wherein one switching unit is arranged at each of the points of intersection, preferably wherein the switching unit can only be switched at different potentials on its switching lines. This allows a compact structure of the contact areas of the floor panel.

Preferably, the directions of the different groups enclose an angle with each other, in particular wherein the angle between the different groups is 90° and/or is equal, thus enabling a clear structure.

For example, the switching lines of the different groups run perpendicular to each other, such that the switching lines of one of the groups form rows and the switching lines of another of the groups form columns. In particular, exactly one switching unit is assigned to each combination of a specific line and a specific column.

The switching lines of at least one of the groups can run in zigzag to allow more complex geometries.

In one variant embodiment, the switching units each have two switching contacts connected to the switching lines, which permits a simple integration of the switching unit into an electric circuit.

For example, one of the switching contacts is connected to a switching line of one group via at least one diode, and the other of the switching contacts is connected to a switching line of the other group, which permits to increase operational safety.

For reliable switching of the contact area, the switching unit can be set up such that it electrically connects the contact area assigned thereto to the potential layer assigned thereto if there is at least a predetermined voltage difference between the switching contacts.

In a further configuration of the disclosure, the ground contact unit has at least one control line, and the switching units have a double switch as a switching element, in particular a relay, wherein the double switch is configured such that the control line is electrically connected to a determined potential layer, in particular the PE layer, only if the contact area is also connected to the determined potential layer. In this way, it is possible to determine the number of contact areas connected to the PE layer.

The number can be queried by voltage measurement across all control lines or by means of a multiplexer alternately across individual control lines.

For example, the double switch is configured such that one of the switches of the double switch can electrically connect the control line to the contact area and the other switch of the double switch electrically connects the contact area to the determined potential layer, in particular the PE layer, only if the control line is also electrically connected to the contact area. It can thus be detected that the contact area is at earth potential, if the control line is also at earth potential.

The double switch may be positively driven so that either the contact area is connected to the control line and the PE layer, or the contact area is only connected to the potential layer assigned thereto.

For example, the contact areas and/or the contact surfaces thereof on the charging surface can be arranged in a lattice in the form of a 2-dimensional Bravais lattice. This lattice is also referred to as the main grid.

In one configuration of the disclosure, the ground contact unit has a first potential layer, a second potential layer and a third potential layer. The contact areas assigned to the first potential layer form first contact areas, the contact areas assigned to the second potential layer form second contact areas, and the contact areas assigned to the third potential layer form third contact areas. The first contact areas are arranged in a first sublattice in the form of a 2-dimensional Bravais lattice, the second contact areas are arranged in a second sublattice in the form of a 2-dimensional Bravais lattice, and the third contact areas are arranged in a third sublattice in the form of a 2-dimensional Bravais lattice. The first sublattice, the second sublattice and the third sublattice are nested, and in the direction of at least one of the basis vectors of the main lattice formed by the contact areas, the first contact areas, the second contact areas and the third contact areas occur alternately. In this way, a highly functional ground contact unit having contact areas that may be switched to different potentials can be realized. Due to the arrangement in the lattice, the position of the contact areas having different potentials to each other is also always known and defined, so that even a part of the charging surface has different contact areas with the different potentials.

Furthermore, the object is achieved by a method of switching a contact area of a ground contact unit according to the disclosure to a desired potential, comprising the following steps:
a) applying a predetermined voltage having a predetermined polarity to the switching lines on which the switching unit assigned to the contact area to be switched is applied, thereby actuating the switching unit so that the contact area is electrically connected to the at least one potential layer assigned to the contact area, and
b) applying the desired potential to the at least one potential layer assigned to the contact area to be switched, in particular via a main disconnector or a disconnector which is arranged in the base body and/or which is connected upstream of the contact area.

In this way, the potential of a contact area can be brought to the desired potential very easily and efficiently. The predetermined voltage is the voltage required to actuate the switching unit.

The main disconnector and/or the disconnector is for example a charging contactor.

For example, a positive voltage, in particular +12 V or +6 V, is applied to the switching line of one of the groups, and a negative voltage, in particular −12 V or −6 V, is applied to the switching line of the other group, as a result of which a defined voltage drop is generated at in particular exactly one switching unit.

To check the switching state of several switching units and/or the potential of several contact areas, a voltage can be determined on the control line, wherein the number of switched and/or non-switched contact areas is adapted to be deduced from the magnitude of the voltage.

In one variant embodiment, the current across one of the switching lines to which the voltage has been applied is limited such that only a predetermined number of switching units can be switched via this switching line. In this way, unintentional faulty switching operations may be prevented.

Furthermore, the object can be achieved by a vehicle battery charging system for automatic conductive connection of a ground contact unit and a vehicle contact unit, to the ground contact unit and a main electrical connection for a current source or an electrical grid, wherein the ground contact unit has a plate-shaped base body, a plurality of potential layers, and a plurality of contact areas which are arranged on an exposed charging surface of the base body, on which the vehicle contact unit can come to rest, and which are assigned to at least one potential layer, wherein the vehicle battery charging system has a main disconnector, for example a main charging contactor, and a plurality of disconnectors, for example charging contactors or relays, wherein the main disconnector is adapted to galvanically isolate a plurality of, in particular all, potential layers from the main connection, wherein one of the plurality of potential layers is assigned to each of the plurality of disconnectors, and wherein the disconnectors are set up to galvanically isolate the potential layer assigned thereto from the main connection. In this way, a double galvanic isolation of the contact surfaces is possible—through the main disconnector or the main charging contactor and the plurality of disconnectors or charging contactors—and at the same time, the potential layers may be purposefully connected to the desired potential via the respective disconnectors. This dual function of the plurality of disconnectors allows components to be saved. In addition, the switching units of the contact areas do not have to be switchable in the state in which they are supplied with current.

In one variant embodiment, the several disconnectors are configured so as to selectively connect the potential layer assigned thereto to one of at least two, in particular to at least three ground connections. In this way, the electrical potential of the corresponding potential layer can be selected in a purposeful manner.

For example, the vehicle battery charging system has a switch cabinet which includes the main connection, the main disconnector (e.g. the main charging contactor) and/or the plurality of disconnectors (e.g. the charging contactors). This allows the ground contact unit to be configured in a cost-effective manner without many components.

The main disconnector and/or the several disconnectors may also be provided in the ground contact unit. For example, the main disconnector is provided in the switch cabinet and the plurality of disconnectors is provided in the ground contact unit. In this way, the vehicle charging system may be adapted to different situations with different spaciousness.

Of course, all the features of the ground contact unit according to the disclosure described above may also be provided in the vehicle battery charging system and vice versa.

BRIEF DESCRIPTION OF THE DRAWINGS

Further features and advantages of the disclosure will become apparent from the description below and from the attached drawings to which reference is made and in which.

DETAILED DESCRIPTION

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than two items.

Figure 1:
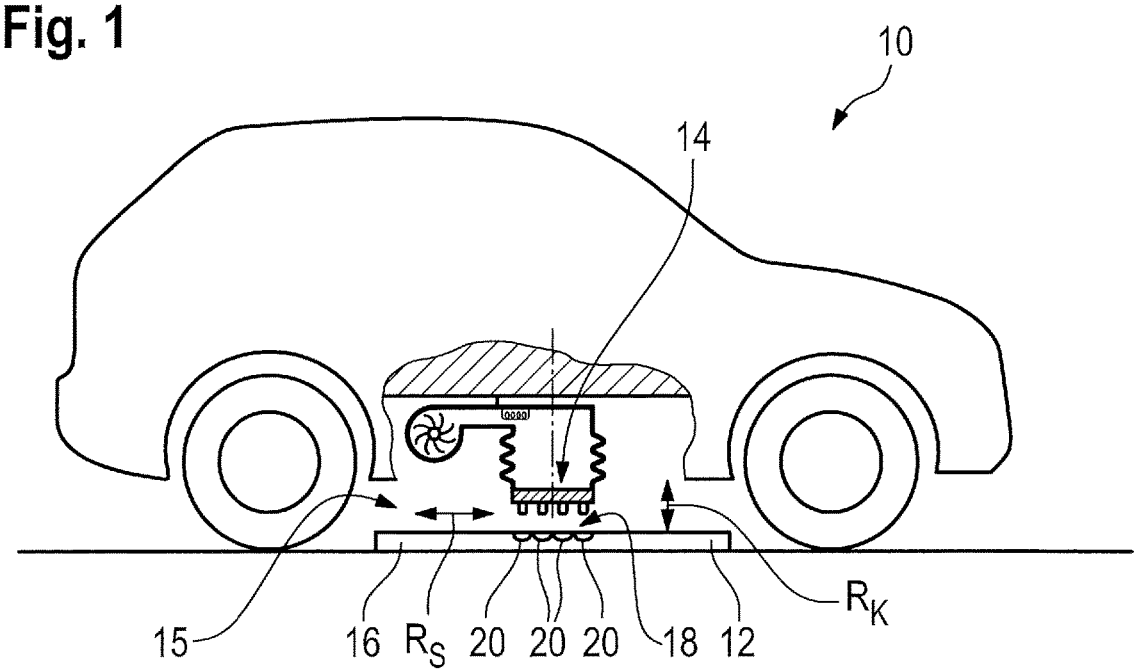
FIG. 1 schematically shows a vehicle coupling system having a vehicle contact unit and a ground contact unit according to the disclosure.

FIG. 1 shows a vehicle 10, for example a battery-powered vehicle or a plug-in hybrid vehicle parked on or above a ground contact unit 12 for charging the battery.

A vehicle connection device having a vehicle contact unit 14 which can electrically connect the vehicle 10 to the ground contact unit 12 is attached to the underbody of the vehicle 10.

The ground contact unit 12 and the vehicle connection device 14 are part of an automatic vehicle coupling system 15, which in turn is part of a vehicle battery charging system.

Figure 2:
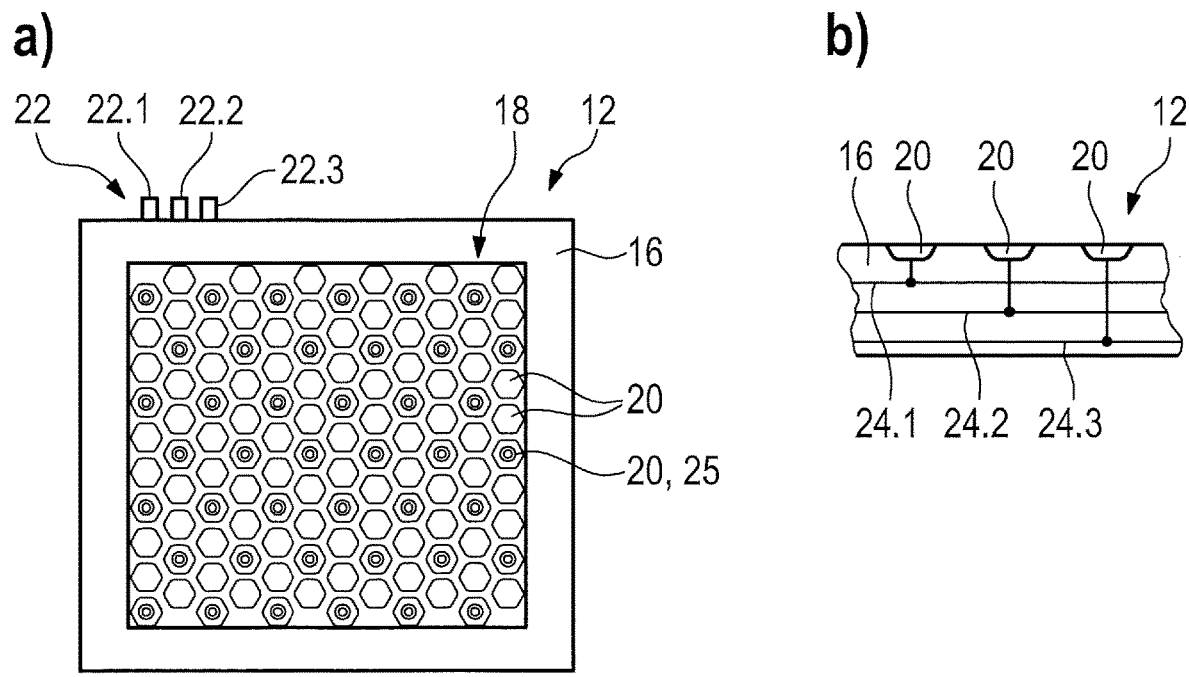
FIG. 2a shows a top view of a first embodiment of a ground contact unit according to the disclosure.
FIG. 2b shows a simplified sectional view of a part of the ground contact unit of FIG. 2a, FIG. 3 schematically shows the arrangement of the different contact areas of the ground contact unit of FIG. 2a, FIG. 4 shows an equivalent circuit diagram for an electrical arrangement of a contact area of the ground contact unit according to FIG. 2a, FIG. 5 shows an equivalent circuit diagram for the electrical arrangement of four contact areas of the ground contact unit according to FIG. 2a, FIG. 6 shows a simplified embodiment of a ground contact unit according to the disclosure.

FIG. 2 shows the ground contact unit 12 in a top view.

The ground contact unit 12 has a plate-shaped body 16, a charging surface 18 being provided on the top side thereof.

The charging surface 18 is exposed on the top side of the ground contact unit 12, i.e. the side facing the vehicle 10 and the vehicle contact unit 14.

Several different contact areas 20 are provided in the charging surface 18, each having at least one contact surface.

The contact areas 20 are each closed surfaces having a hexagonal, in particular regular hexagonal contour. If necessary, the corners of the hexagon may have a radius.

The contact areas 20 and/or the contact surfaces may lie in one plane, the charging surface 18 being for example this plane.

The contact areas 20 are arranged in a main pattern. In the embodiment shown, the main pattern is a two-dimensional Bravais lattice, or more precisely a hexagonal lattice. The main pattern is thus a main lattice $G_H$ having two basis vectors $h_1$, $h_2$ of the same length, which enclose together an angle of 120°.

The main pattern or main lattice $G_H$ extends over the entire charging surface 18.

In addition, the ground contact unit 12 has a plurality of, in the example embodiment three ground connections 22, namely a first ground connection 22.1, a second ground connection 22.2 and a third ground connection 22.3, which are connected via a main connection 23 to corresponding connections of the local electrical grid (not shown) at the location of the ground contact unit 12. Each of the ground connections 22 provides a different electrical potential.

As shown in FIG. 2b, at least one potential layer 24 for each potential of the ground connections 22 is provided in the ground contact unit 12. In the example embodiment shown, there is therefore a first potential layer 24.1, a second potential layer 24.2 and a third potential layer 24.3.

However, there are for example three potential layers 24, although other numbers of potential layers 24 are also possible. In the example embodiment shown, the potential layers 24 are essentially continuous or full-surface layers in the ground contact unit 12 which are made of a conductive material. The potential layers 24 extend at least over the entire area of the charging surface 18. The different potential layers 24 are isolated from each other.

For example, the potential layers 24 are conductive layers of a circuit board.

Of course, the potential layers 24 do not have to be complete or flat layers. Furthermore, the potential layers 24 may also consist of a corresponding cabling.

For example, the first ground connection 22.1 is electrically connected to the phase or an outer conductor of the local electrical grid via the main connection 23, the second ground connection 22.2 is electrically connected to a neutral conductor of the local electrical grid via the main connection 23, and the third ground connection 22.3 is electrically connected to a protective conductor of the local electrical grid via the main connection 23.

Accordingly, the potential layers 24.1, 24.2 or 24.3 assigned to the ground connections 22.1, 22.2 and 22.3 may be connected to the potential of the outer conductor, the neutral conductor or the protective conductor (earth potential; PE). The third potential layer 24.3 is therefore also referred to as PE layer.

In order to electrically connect the ground connections 22 to the corresponding potential layer 24, one disconnector 27 (FIG. 11), for example a charging contactor or a relay, is provided for each of the potential layers 24. The disconnector 27 can be dispensed with in the case of the PE layer.

The disconnectors 27 may be provided in the base body 16 and be connected upstream of the contact areas 20, i.e. be arranged between the ground connections 22 or the main connection 23 and the contact areas 20 or the switching units 26.

It is also conceivable that the disconnectors 27 are provided in a switch cabinet 70 of the vehicle battery charging system outside the ground contact unit 12.

The disconnectors 27 can, for example, disconnect the potential layer 24 assigned thereto from the ground connection 22 assigned to the potential layer 24 or connect it to the PE connection of the ground connections 22.

Figure 11:
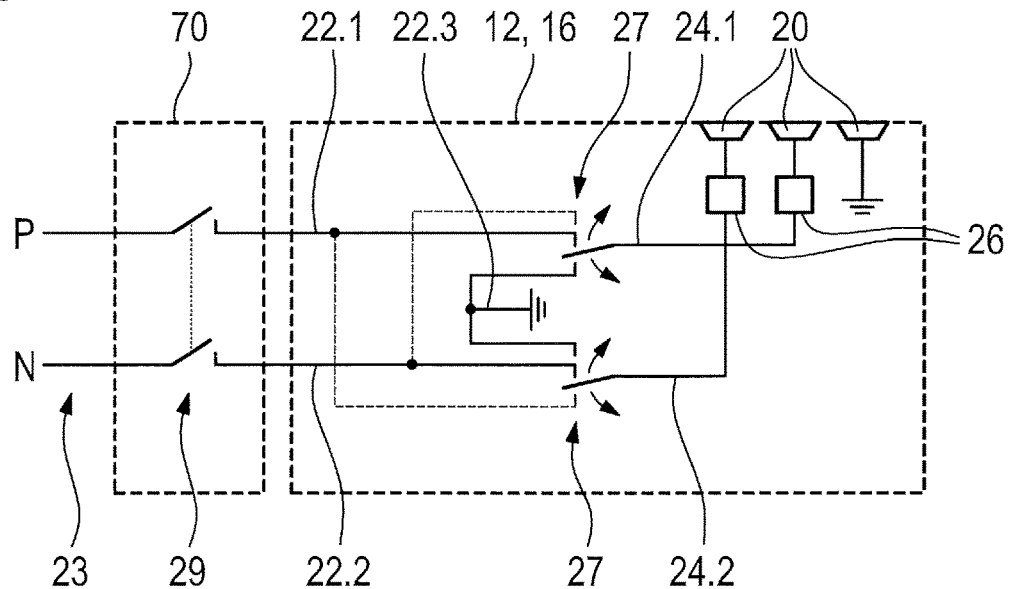
FIG. 11 shows a schematic structure of the ground side part of a vehicle battery charging system according to the disclosure.

It is also possible that the disconnector 27 can connect the potential layer 24 assigned thereto to one of three (or more) of the ground connections 22, in order to be able to vary the electrical potential of the potential layers 24. This is indicated in FIG. 11 by the dotted lines.

In an alternative embodiment, no disconnectors 27 are provided, as the contact areas 20 may also be separated from the ground connection 22 assigned to the corresponding potential layer 24 by means of the switching units 26. For this purpose, the contact areas 20 are connected to the PE connection of the ground connections 22.

In addition, a main disconnector 29 is provided, which is configured as a main charging contactor in the example embodiment shown. In the example embodiment shown, the main disconnector 29 is provided in the switch cabinet 70.

It is of course also possible to use switches other than charging contactors as a main disconnector 29 and as a disconnector 27, for example relays.

The main disconnector 29 is provided between the main connection 23 and the disconnectors 27.

In the case of direct current charging, the first and second ground connections 22.1, 22.2 are connected to the positive and negative pole of a direct current source for charging.

Each of the contact areas 20 is connected or connectable to one of the potential layers 24. The electrical connection can be permanent or switchable. With switchable contact areas 20, the electrical connection can be switched back and forth between two potential layers 24, or the electrical connection to a potential layer can be interrupted.

One potential layer 24 to which the contact area 20 is electrically connected if this contact area 20 is contacted by the vehicle contact unit 14 is assigned to each contact area 20.

Two thirds of the contact areas 20 are for example switchable, and the other third of the contact areas 20 is not switchable.

In the first embodiment, three different types of contact areas 20 are provided, the first contact areas 20.1 being assigned to the first potential layer 24.1, the second contact areas 20.2 to the second potential layer 24.2 and the third contact areas 20.3 to the third potential layer 24.3.

The first contact areas 20.1 and the second contact areas 20.2 are switchable. They can be connected to the first potential layer 24.1 or the second potential layer 24.2 so as to be switchable using the arrangement shown in FIG. 4.

In the example embodiment shown, the third contact areas 20.2 are permanently electrically connected to the third potential layer 24.3, i.e. the PE layer. The third contact areas 20.3 thus represent PE contact areas 25.

Figure 3:
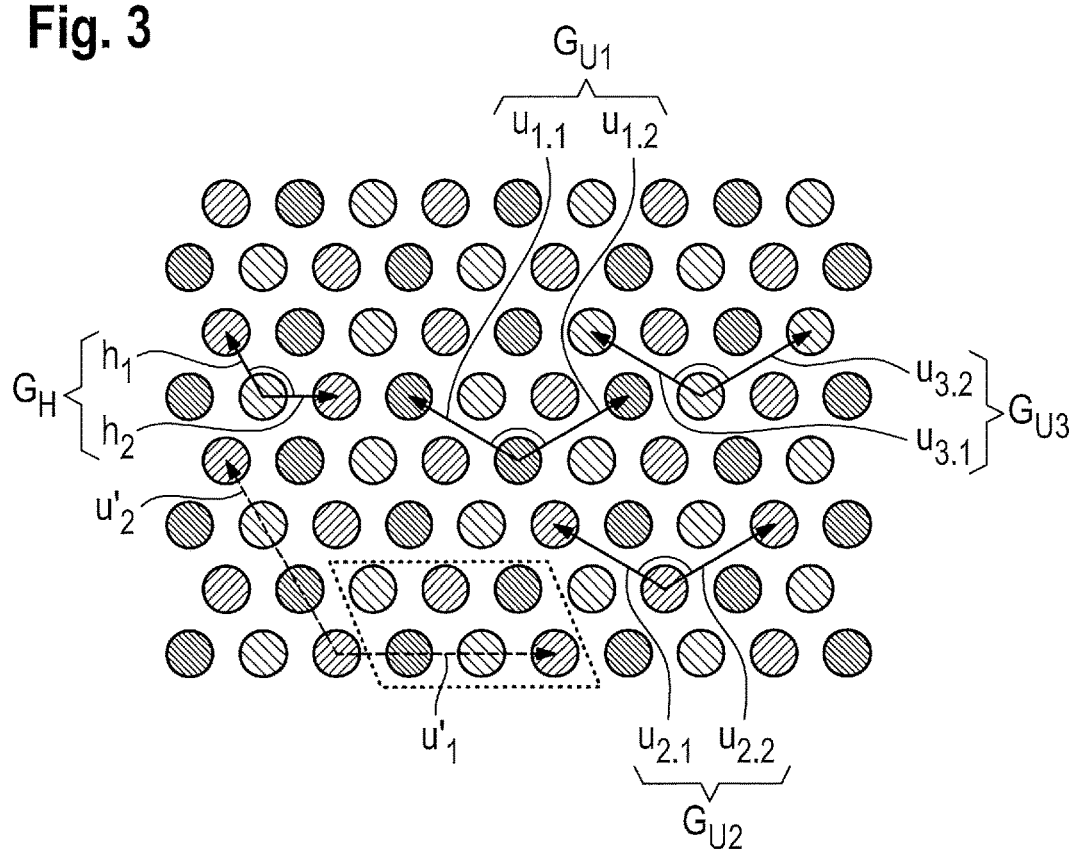

FIG. 3 shows sections of the main lattice $G_H$ composed of the contact areas 20 or 20.1, 20.2, 20.3. For the sake of simplification, the contact areas 20 are shown as circles.

The first contact areas 20.1, the second contact areas 20.2 and the third contact areas 20.3 or PE contact areas 25 are each arranged in their own sub-pattern, here each in the form of a two-dimensional Bravais lattice, i.e. a sublattice.

The first contact areas 20.1 are arranged in a first sublattice $G_{U1}$ having the basis vectors $u_{1,1}$, $u_{1,2}$. The first sublattice $G_{U1}$ is also a hexagonal lattice, so that the two basis vectors $u_{1,1}$ and $u_{1,2}$ have the same magnitude and enclose an angle of 120° with each other.

Similarly, the second contact areas 20.2 are arranged in a second sublattice $G_{U2}$ having the basis vectors $u_{2,1}$, $u_{2,2}$, which also have the same magnitude and enclose an angle of 120°.

The third contact areas 20.3 or PE contact areas 25 are also arranged on a hexagonal, third sublattice $G_{U3}$ having the basis vectors $u_{3,1}$, $u_{3,2}$, which have the same length and include an angle of 120°.

The three sublattices $G_{U1}$, $G_{U2}$, $G_{U3}$ are arranged nested into each other, so that the three different contact areas 20.1, 20.2, 20.3 or 25 occur in continuous alternation along the direction of one of the basis vectors $h_1$, $h_2$ of the main lattice $G_H$.

In other words, the contact areas 20.1, 20.2, 20.3 and 25 closest to any contact area 20.1, 20.2, 20.3 and 25 considered are always of a different type than the contact area 20.1, 20.2, 20.3 and 25 considered.

The contact areas 20.1, 20.2, 20.3 or 25 or the contact surfaces are thus arranged in a rotationally symmetrical manner about an axis of rotation perpendicular to the charging surface 18. The entire ground contact unit 12 can also be configured so as to be rotationally symmetrical, i.e. at least the visible parts required for connection to the vehicle contact unit 14 are arranged in a rotationally symmetrical manner.

Figure 4:
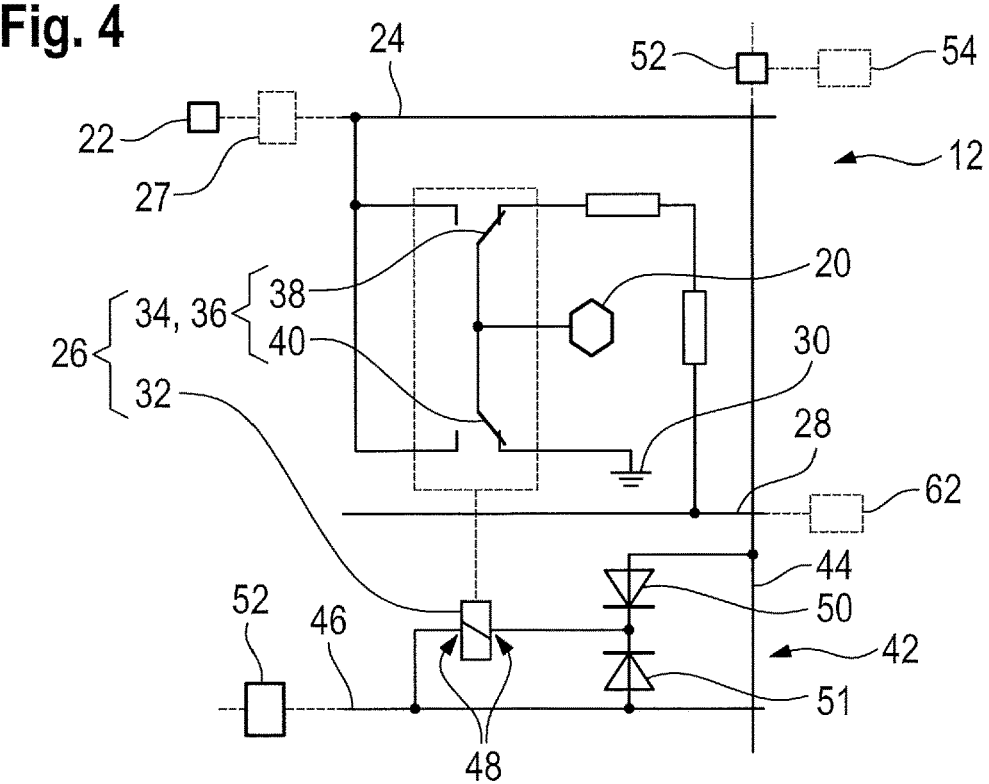

FIG. 4 shows a detail of an equivalent circuit diagram of the ground contact unit 12, which shows an electrical arrangement for a switchable contact area 20.

The switchable contact area 20 can be connected to different potential layers 24 using the electrical arrangement.

The contact area 20 is located in the middle of FIG. 4 and the potential layer 24 assigned to the contact area 20 is shown as the top line in FIG. 4.

In addition, a switching unit 26, a control line 28 and a grounding 30 are provided for each switchable contact area 20.

The grounding 30 may be configured as a permanent connection to a potential layer 24 which is at earth potential, i.e. to the PE layer.

The switching unit 26 has an actuating element 32 and a switching element 34 and is configured in the example embodiment shown as an electromechanical switch, here as a relay having a relay switch as switching element 34 and a relay coil as actuating element 32.

In the example embodiment shown, the switching element 34 is a double switch 36 including a first switch 38 and a second switch 40.

Both the first switch 38 and the second switch 40 each form a changeover contact which is always connected to the contact area 20.

The first switch 38, shown in the upper part of FIG. 4, can electrically connect the contact area 20 either to the control line 28 or to the potential layer 24.

The second switch 40, shown in the lower part, can connect the contact area 20 either to the grounding 30 or to the potential layer 24.

The double switch 36 can be actuated by the actuating element 32, the first switch 38 and the second switch 40 being actuated simultaneously.

The first switch 38 and the second switch 40, i.e. the double switch 36, are configured such that either the contact area 20 is electrically connected to the grounding 30 and the control line 28, or such that the contact area 20 is electrically connected only to the potential layer 24.

In other words, the switches 38 and 40 or the double switch 36 are positively driven.

The contact area 20 can therefore be electrically connected to the assigned potential layer 24 or separated, i.e. interrupted from the potential layer 24 by means of the switching unit 26.

An electric circuit 42 is provided for the electrical actuation or switching of the switching unit 26, which has a first switching line 44 running vertically (i.e. from the top to the bottom) in FIG. 4, and a second switching line 46 running horizontally (i.e. from the left to the right) in FIG. 4.

The first switching line 44 and the second switching line 46 can be supplied with current or voltage separately from each other via corresponding electrical drive switches 52. The electrical drive switches 52 are actuated, for example, by a control unit 54 of the ground contact unit 12.

Both the first switching line 44 and the second switching line 46 are connected to the switching unit 26, more precisely to the actuating element 32.

For this purpose, the switching unit 26 or the actuating element 32 has two switching contacts 48. One of the two switching contacts 48 is electrically connected to both switching lines 44, 46 via a respective diode 50, 51. The cathodes of the diodes 50, 51 face the actuating element 32, for example.

The diode 50 between the switching contact 48 and the switching line 44 has a switching function, whereas the diode 51 between the switching contact 48 and the switching line 46 is a protective diode that protects the actuating element 32 from overvoltage upon switching off.

The other switching contact 48 is electrically connected to only one switching line, in the example embodiment shown to the second switching line 46.

In the unactuated state of the switching unit 26, i.e. when there is no voltage between the switching contacts 48, the double switch 36 is in the position shown in FIG. 4, i.e. the contact area 20 is electrically connected to the grounding 30 and the control line 28.

In order to switch the switching unit 26 and thus electrically connect the contact area 20 to the assigned potential layer 24, a voltage must be generated via the switching contacts 48, for example a voltage of 24 V or 12 V.

To this end, a positive voltage of +12 V or +6 V, for example, is applied to the first switching line 44, and a negative voltage of −12 V or −6 V, for example, is applied to the second switching line 46.

As the diode 50 of the first switching line 44 is now supplied with voltage in the switching direction, a voltage of 24 V or 12 V, respectively, is applied between the switching contacts 48 and thus to the actuating element 32, the switching element 34, i.e. the double switch 36, being thus flipped.

If a voltage or a voltage with reversed polarity is applied to only one of the switching lines 44, 46, no potential difference or voltage is created at the switching contacts 48 and the actuating element 32 due to the diode 50, so that the double switch 36 will fall back to its initial position.

The switching state of the switching unit 26 thus depends on the signal state on the switching lines 44, 46, i.e. whether and with which polarity a voltage is applied to the switching lines 44, 46.

The contact areas 20 can thus be electrically connected to the potential layer 24 assigned thereto and can thus be activated.

The arrangement shown in FIG. 4 is used for all switchable contact areas 20, for example for the first contact areas 20.1 and the second contact areas 20.2.

Figure 5:
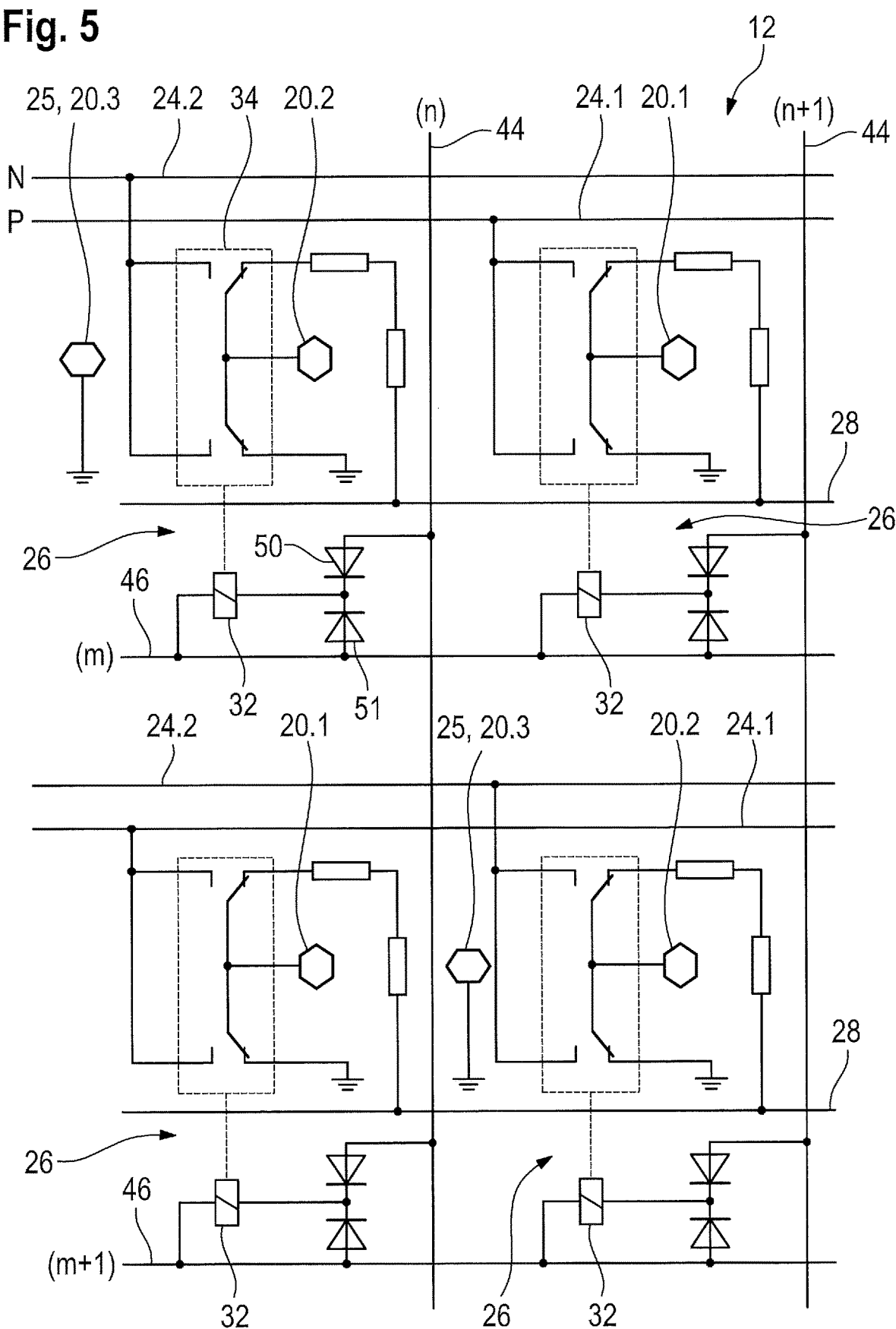

FIG. 5 shows an equivalent circuit diagram for six adjacent contact areas 20.

The contact areas 20 shown are enclosed by way of example by a dotted line in FIG. 3. Thus, two first contact areas 20.1, two second contact areas 20.2 and two third contact areas 20.3 or PE contact areas 25 are shown.

It can be clearly seen that the first and second contact areas 20.1, 20.2 are switchable contact areas 20.

Instead of the general potential layer 24 in FIG. 3, two potential layers 24 are of course now shown, more precisely the first potential layer 24.1 and the second potential layer 24.2.

The third potential layer 24.3 or PE potential layer is not shown continuously, rather, an electrical connection thereto is indicated as a grounding symbol.

Each of the switchable contact areas 20.1, 20.2 has a switching unit 26 assigned thereto.

The first contact areas 20.1 can be electrically connected to the first potential layer 24.1 via the switching unit 26 assigned thereto, and the second contact areas 20.2 can be electrically connected to the second potential layer 24.2 via the switching unit 26 assigned thereto.

FIG. 5 clearly shows that the switchable contact areas 20.1 and 20.2 are arranged in rows and columns with regard to their cabling of the electric circuit 42.

In FIG. 5, for example, the columns (n) and (n+1) and the rows (m) and (m+1) are partly shown. For example, the contact area 20.1 shown in the upper right-hand part of FIG. 5 is in column (n+1) and row (m).

Each row and column has exactly one switching line 44, 46. In other words, each column or row is defined by the corresponding switching line 44, 46.

For example, each column is formed by a vertical first switching line 44, and each row is formed by a horizontally running second switching line 46.

The first switching lines 44 thus belong to a first group of switching lines representing the columns, and the second switching lines 46 belong to a second group of switching lines representing the rows.

FIG. 5 therefore shows the (n)th and (n+1)th first circuit line 46 and the (m)th and (m+1)th second circuit line 46.

The (n)th first switching line 44 is connected to the switching units 26, more precisely to the actuating elements 32 which are assigned to the contact areas 20 of the (n)th column and switch them. The same applies to the (n+1)th first switching line 44.

In a similar way, the (m)th second switching line 46 is electrically connected to the switching units 26, more precisely to the actuating elements 32 to the contact areas 20 of the (m)th column. The same applies to the (m+1)th second switching line 46.

Figure 6:
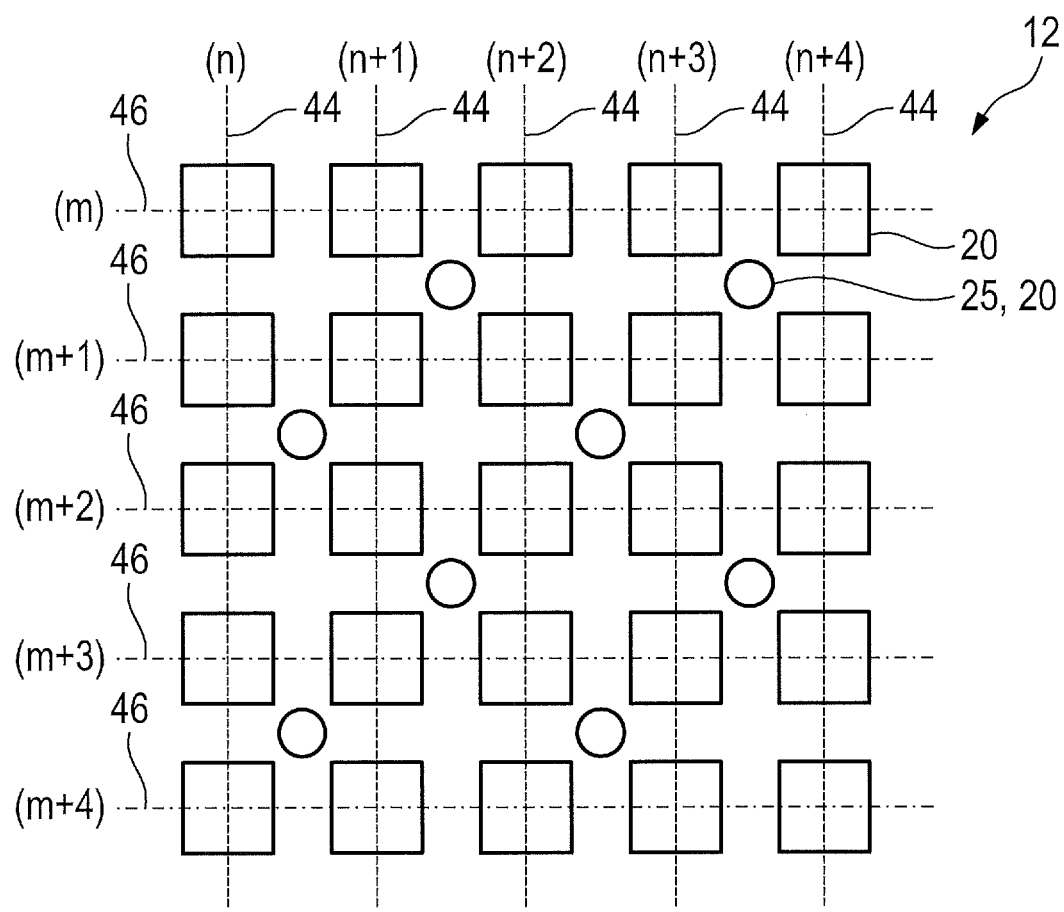

For illustration purposes, FIG. 6 shows a ground contact unit 12 of a different, simplified embodiment in which the contact areas 20 or the contact surfaces are square and are arranged in a square Bravais lattice.

The first switching lines 44 and second switching lines 46 are indicated by dashed or dotted lines. In this embodiment, the physically geometrical arrangement of the switchable contact areas 20 also corresponds to the electrical arrangement of the switchable contact areas 20, as a result of which the subdivision of the contact areas into rows and columns becomes more clearly apparent.

In this simplified embodiment, the first switching lines 44 run parallel to each other, but perpendicular to the second switching lines 46, which also run parallel to each other.

The switching lines 44, 46 thus form a lattice, a switching unit 26 or a switchable contact area 20 being assigned to each point of intersection.

Thus, exactly one combination of first switching lines 44 and of second switching lines 46 by means of which the switching unit 26 can be switched is assigned to each switchable contact area 20 or to the switching unit 26 thereof.

Another switching unit 26 differs from any switching unit 26 in that at least one other first or second switching line 44, 46 is electrically connected thereto.

In particular, only one switching line 44 or 46 per group is provided for each switching unit 26.

To connect the contact area 20.1 in column (n+1) and row (m) to the potential layer 24.1 in the first embodiment according to FIG. 5, for example, a positive voltage is applied to the (n+1)th first switching line 44 and a negative voltage is applied to the (n)th second switching line 46, as already described as to FIG. 4. The remaining first and second switching lines 44, 46 remain without current or voltage.

If the switchable contact area 20.2 of the (n+1)th column and (m+1)th row is also to be electrically connected to the potential layer 24.2 assigned thereto, a negative voltage is additionally applied to the (m+1)th second switching line 46.

Thus, a positive voltage is applied to one of the switching lines 44 of the first group of switching lines and a negative voltage is applied to two second switching lines 46 of the second group. The switching units 26, which are assigned to the contact areas 20 of column (n+1) and the rows (m) and (m+1) are thus actuated and the contact areas 20.1 and 20.2 electrically connected to the potential layers 24.1 and 24.2 assigned thereto.

At the same time, the current across the first switching line 44 of the (n+1)th column is limited in order to prevent substantially more than two switching units 26 from being actuated.

The current is limited to a value which is sufficient to actuate approximately two switching units 26. Although in this case one or two switching units 26 too much may switch at the same time, the current limitation can prevent considerably more switching units, for example 10 or 30 switching units 26 too much from being switched.

In the example embodiment shown, a control line 28 which branches off, if necessary, to be contacted by the double switch 36 is provided for each row.

One voltage source 62 is provided for each line on each control line 28.

The voltage between the control line 28 and earth potential or PE potential is measured to check whether all switchable contact areas 20 of the corresponding row are at earth potential, i.e. are not activated.

The measured voltage depends on the number of points in which the control line 28 is connected to the grounding 30, so that it can be checked whether all switching units 26 are in their non-activated state.

Figure 12:
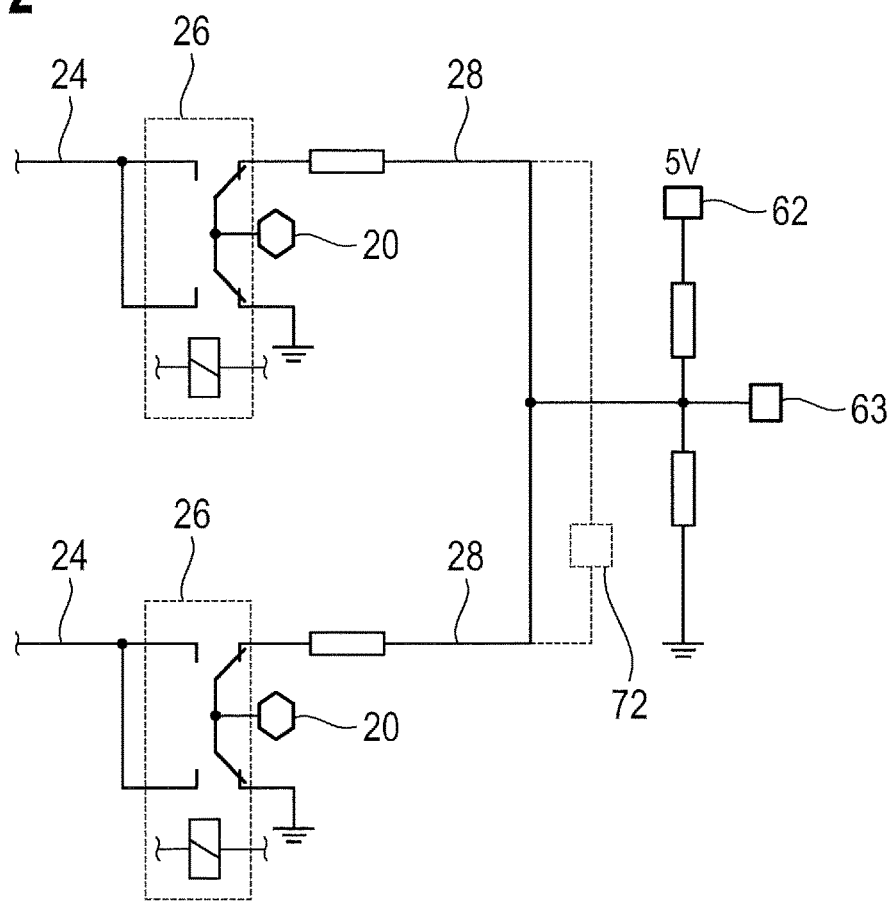
FIG. 12 shows an equivalent circuit diagram for the electrical arrangement of two control lines of the ground contact unit according to FIG. 2a, and FIG. 13 shows an equivalent circuit diagram for an electrical arrangement of a contact area of the ground contact unit of a further embodiment according to the disclosure.

As an example, FIG. 12 shows an equivalent circuit diagram, in which the control line 28 is represented for two contact areas 20 of one row. The switching units 26 realize a variable voltage divider having several arms which divides the voltage generated by the voltage source 62. Each switching unit 26 represents one arm.

A voltmeter 63 measures the voltage to earth potential through one arm of the voltage divider. The more switching units 26 connect the control line 28 to the respective grounding 30, the lower the voltage measured by the voltmeter 63. The number of unactuated switching units 26—and thus also of actuated switching units 26—can be determined on the basis of the measured value of the voltage.

In this way, switching units 26 can be identified which have got stuck in the actuated state. This may occur, for example, if the switching unit 26 has been actuated while a high potential was applied to the corresponding potential layer 24. An arc may have then been generated during the switching process, which welded the switching element 34 to the corresponding mating point. In particular positively driven switching elements 34 can thus be monitored with a high degree of safety.

It is also conceivable to use a multiplexer 72 to measure the voltage between one of the control lines 28 and the earth potential individually in time alternation. A multiplexer is indicated by a dotted line in FIG. 12.

Figure 7:
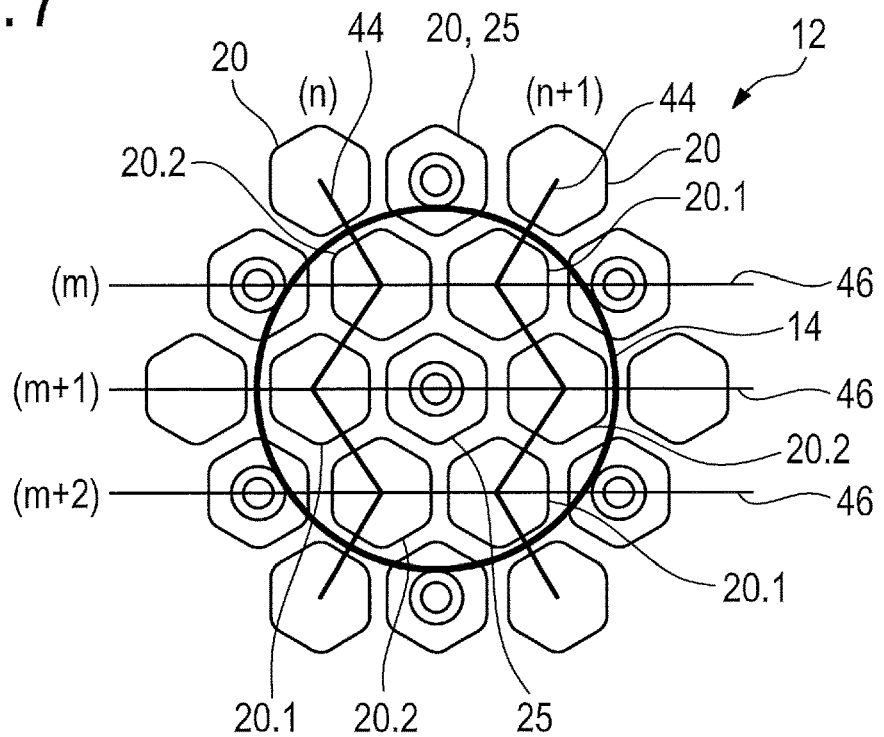
FIG. 7 shows a top view of a part of the ground contact unit of FIG. 2a with a vehicle contact unit indicated.

FIG. 7 shows an enlarged part of the charging surface 18 of the ground contact unit 12 in accordance with the first embodiment of FIGS. 2 and 4, the first switching lines 44 and the second switching lines 46 being additionally drawn in.

In addition, a contact area of the vehicle contact unit 14 is indicated by a circle encircling the contact areas 20 contacted by the vehicle contact unit 14.

Six switchable contact areas 20 are provided around the central PE contact area 20. These are also referred to as the first ring.

It is conceivable that six potential layers 24 are provided for these six switchable contact areas 20, one potential layer 24 being assigned to each of these six contact areas 20.

It is also conceivable that two potential layers 24 are provided for these six switchable contact areas 20. These can be supplied with a positive or negative potential for a charging with direct current. In the case of alternating current, the potential layers can represent the neutral conductor and the phase.

It is also conceivable that four potential layers 24 are provided for these six switchable contact areas 20, namely three potential layers for the phases and one for the neutral conductor when charging with alternating current.

It is also conceivable that six potential layers 24 are provided for these six switchable contact areas 20, namely three potential layers for the phases and three potential layers for the neutral conductor during charging with alternating current.

The PE layer 25 represents a seventh potential layer.

In this case, seven sublattices are produced as the sublattices $G_{U1}$ and $G_{U2}$ then break down into three sublattices each. These sublattices have basis vectors which enclose an angle of 120°, for example. A pair of such basis vectors $u'_1$ and $u'_2$ is shown as dashed lines in FIG. 3.

It is conceivable that three potential layers 24 are provided for these six switchable contact areas 20, which represent the three phases for a charging with alternating current.

As in the simplified embodiment of FIG. 6, the first embodiment includes a group of first switching lines 44, which runs vertically in FIG. 7, and a second group of second switching lines 46, which runs horizontally in FIG. 7.

Due to the hexagonal shape of the contact areas 20 or contact surfaces, the columns do not run in a straight line but in a zigzag. However, the direction of the columns is still essentially vertical and forms an angle of 90° with the rows, for example.

The first switching lines 44 of the first group thus connect contact areas 20 or the switching units 26 thereof, which are slightly offset to each other, so that it is assumed that the first switching lines 44 also run in a zigzag.

FIG. 7 also clearly shows that the columns run such that there are no PE contact areas 25 in the columns.

In the example shown in FIG. 7, a PE contact area 25 and the contact areas 20 of columns (n) and (n+1) and rows (m), (m+1) and (m+2) are located within the part of the charging surface 18 which is contacted by the vehicle contact unit 14.

As soon as these switchable contact areas 20 and the PE contact area 25 are electrically contacted by corresponding electrodes (not shown) of the vehicle contact unit 14, the corresponding switchable contact areas 20 are activated.

For this purpose, as described in FIG. 5, the first switching lines 44 of columns (n) and (n+1) and the second switching lines 46 of rows (m), (m+1) and (m+2) are supplied with the predetermined positive and negative voltages for switching the switching units 26, so that the six switchable contact areas 20 are connected to the potential layers 24.1 and 24.2 assigned thereto.

The desired contact areas 20 are now connected to the potential layers 24.1 and 24.2 assigned thereto, and the potential layers 24.1 and 24.2 can in turn be electrically connected to the corresponding ground connections 22 to apply the desired potential to the potential layers 24.1, 24.2. For this purpose, the disconnectors 27 of the potential layers 24.1 and 24.2 are closed.

It is also conceivable that the disconnectors 27 for switching the contact areas 20 remain closed (or that no disconnectors 27 are present) and that instead the main disconnector 29, in this case the main charging contactor, is open in order to galvanically isolate the contact areas 20 or potential layers 24 from the main connection 23 for switching. In this case, the main disconnector 29 is now closed.

The respectively desired potential is then applied to the potential layers 24 and thus to the contact areas 20 of the columns (n) and (n+1) and the rows (m), (m+1) and (m+2). The vehicle 10 can now be charged via the vehicle contact unit 14.

When the charging process is complete, the potential layers 24.1 and 24.2 are disconnected from the ground connections 22 assigned thereto.

The corresponding contact areas 20 are then deactivated by taking the voltage from the first and second switching lines 44, 46.

The corresponding switching units 26 switch in their unactuated state, as a result of which the electrical connection between the contact area 20 and the respective potential layer 24 is interrupted. At the same time, the corresponding contact area 20 and the control line 28 are electrically connected to the grounding 30 via protective resistors.

It can then be checked via the control line 28 whether the contact areas 20 have been completely separated from their associated potential layer 24.1 or 24.2.

In this way, it is possible to realize a functional ground contact unit 12 having a large number of mechanical switching units 26 and thus contact areas 20 having a comparatively small number of electrical drive switches 52 and with savings of electrical lines.

In the example embodiment discussed, for example, only x+y electrical drive switches 52 are required for an arrangement of the contact areas 20 with x columns and y rows, i.e. a quantity of x·y mechanical switching units 26.

This leads to a significant simplification of the ground contact unit 12.

In the following, further embodiments of the ground contact unit 12 according to the disclosure are described, which essentially correspond to the first embodiment. Therefore, only the differences will be discussed, and identical and functionally identical parts are provided with the same reference numbers.

Figure 8:
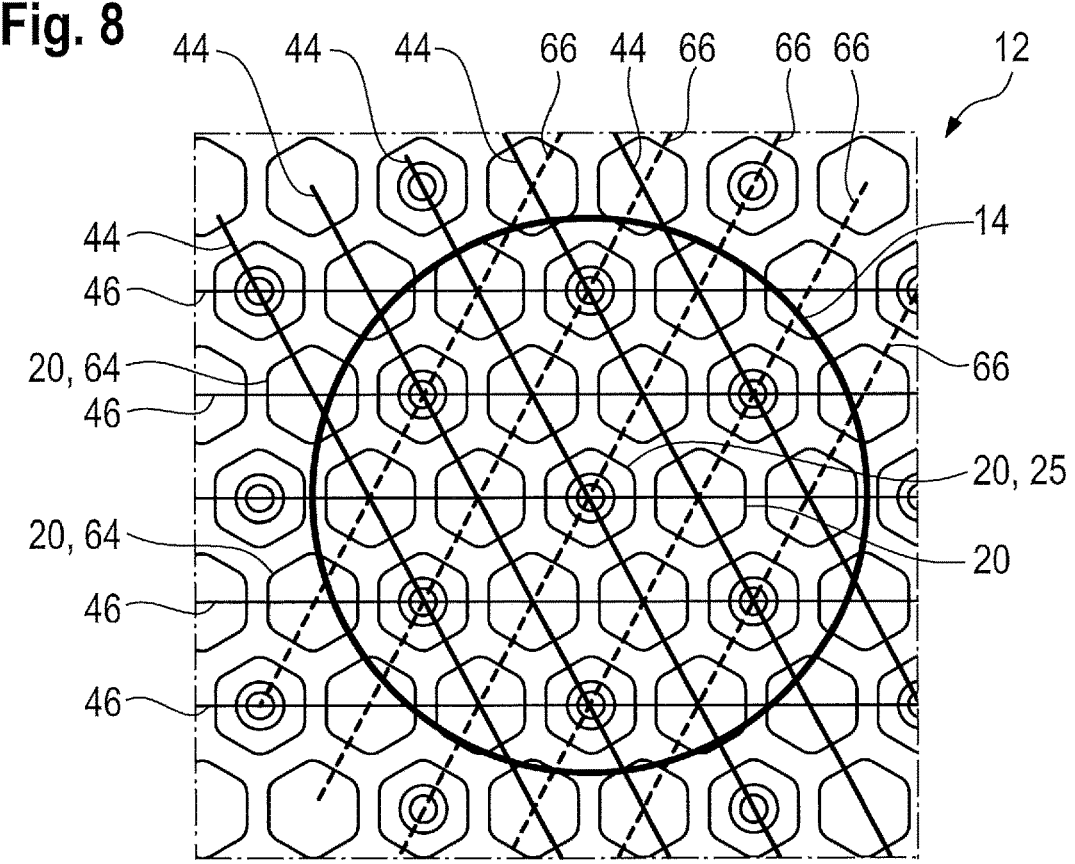
FIG. 8 shows a top view of a part of a second embodiment of a ground contact unit according to the disclosure with a vehicle contact unit indicated.

FIG. 8 shows a ground contact unit 12 to be connected to a vehicle contact unit 14 which is larger than the vehicle contact unit 14 according to FIG. 7. More precisely, not only the six switchable contact areas 20 around a central PE contact area 25 (first ring) should be used, but also the switchable contact areas 20 in the next ring around the central PE contact area 25.

It is then no longer possible to drive the contact areas via only two groups on switching lines, as in this case switchable contact areas 20 which are not located below the vehicle contact unit 14 would be activated. This represents a safety risk and should be avoided. For illustration purposes, these switchable contact areas 20 are additionally marked with the reference sign 64.

In order to achieve a more purposeful drive of the switchable contact areas 20, a third group of switching lines, namely third switching lines 66, is used.

These third switching lines 66 define a further type of column in addition to the already existing row and the existing column.

The rows or the two types of columns each run perpendicular to the side surfaces of the hexagonal contact areas 20, so that an angle of 60° is respectively enclosed between the rows and columns or between the two columns. The rows and the two columns are represented by lines in FIG. 8.

The switching units 26 of the contact areas 20 are thus each connected to three switching lines 44, 46, 66, and the corresponding switching element is only actuated when the switching lines 44, 46, 66 are supplied with voltage in a specific way. A suitable logic circuit (AND, NAND) and/or a transistor circuit is/are appropriate for this purpose.

A control line 28 by means of which it can be checked whether the corresponding contact areas 20 are deactivated, i.e. are at earth potential, can be provided for each line also in this embodiment.

Figure 9:
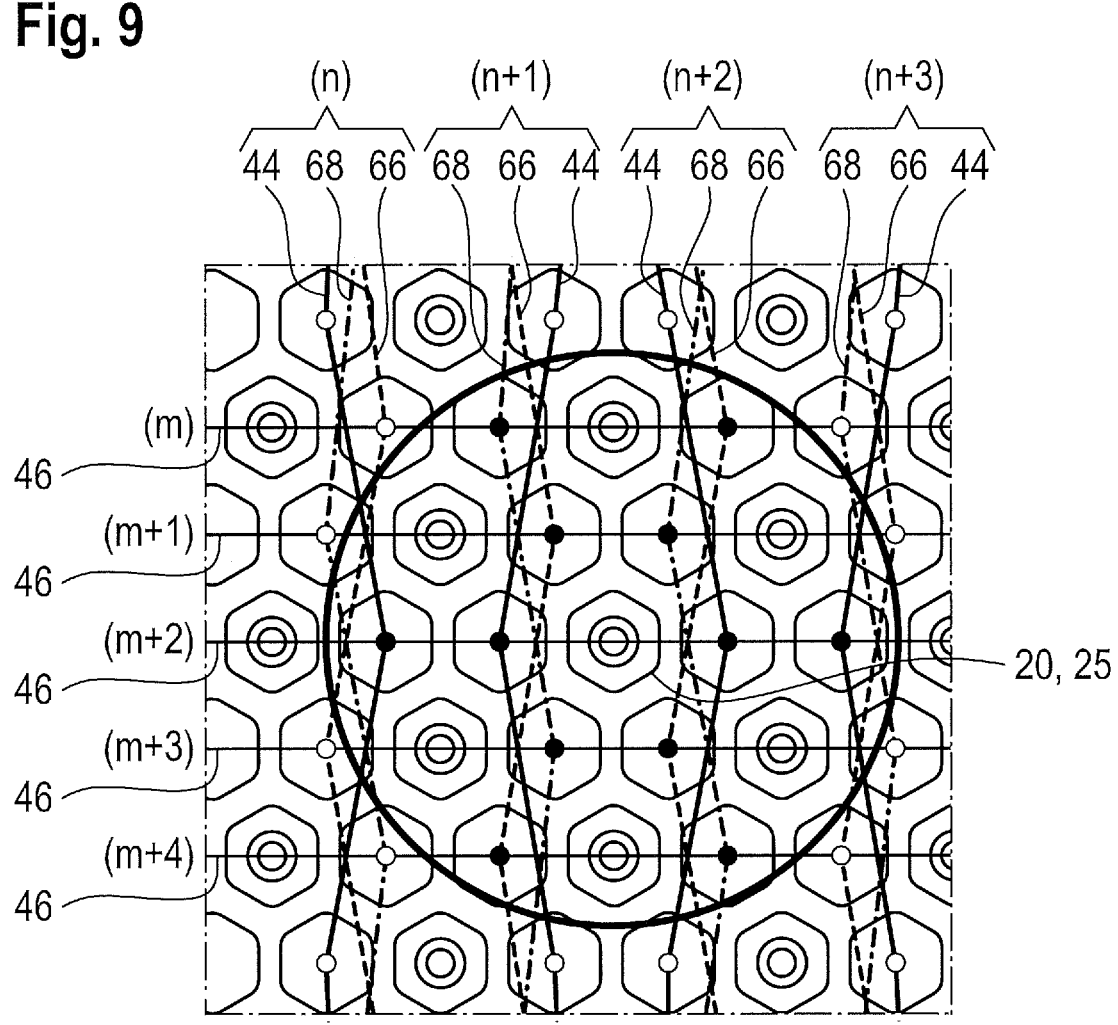
FIG. 9 shows a top view of a part of a third embodiment of a ground contact unit according to the disclosure with a vehicle contact unit indicated.
Figure 10:
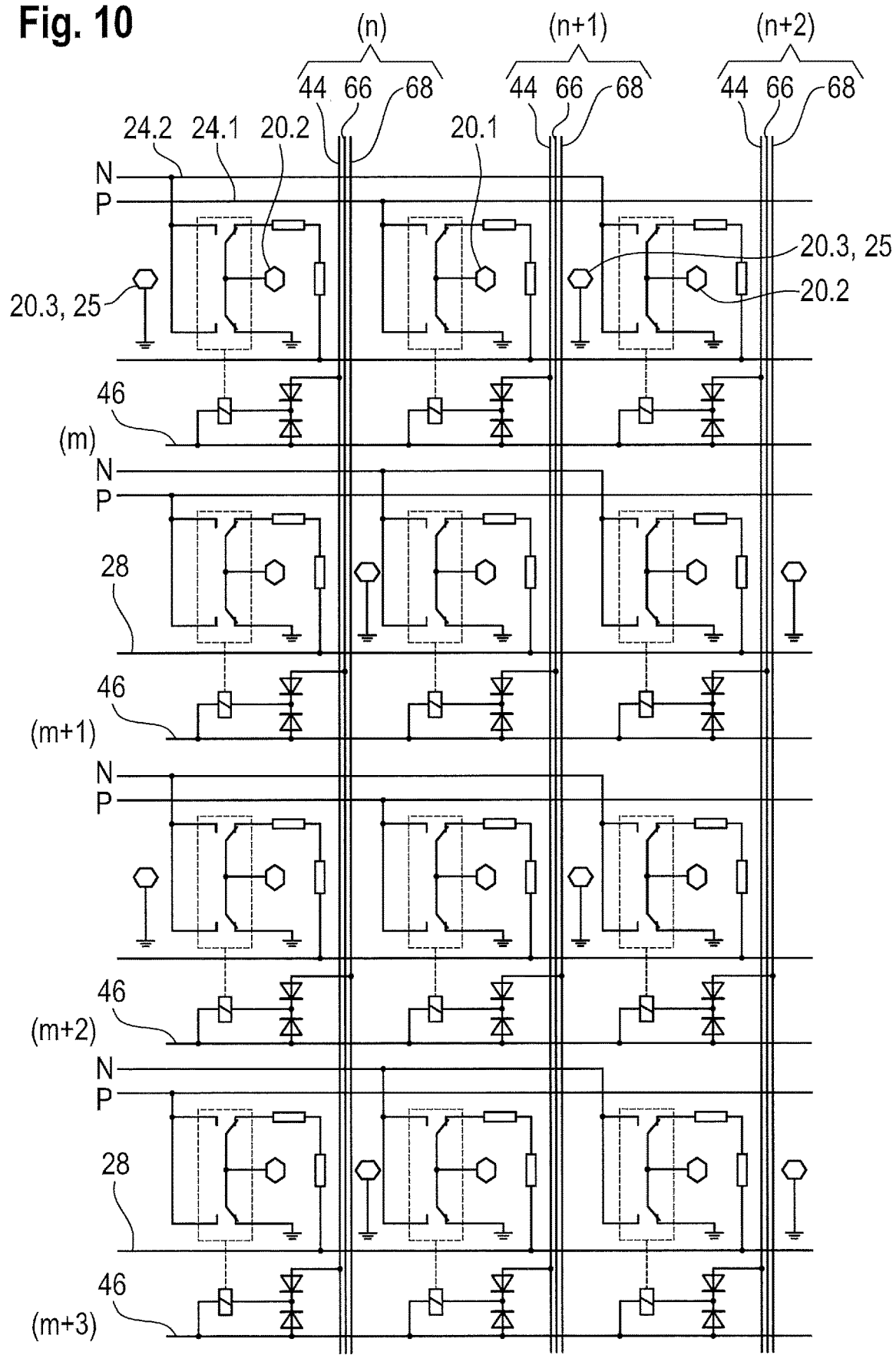
FIG. 10 shows a part of an equivalent circuit diagram of the ground contact unit of FIG. 9.

FIGS. 9 and 10 show a third embodiment of the ground contact unit 12, which, as the embodiment of FIG. 8, should also be suitable for a larger vehicle contact unit 14.

In this third embodiment, four groups of switching lines are provided, namely first switching lines 44, second switching lines 46, third switching lines 66 and fourth switching lines 68.

As in the previous embodiments, the second switching lines 46 form the rows of the arrangement. However, in the third embodiment, only one type of column is provided, which is defined by the three remaining groups of lines, i.e. the first switching lines 44, the third switching lines 66 and the fourth switching lines 68. The columns therefore correspond to the columns of the first embodiment.

In contrast to the first embodiment, however, not every switchable contact area 20 or the assigned switching unit 26 thereof is electrically connected to each of the first switching line 44, the third switching line 66 and the fourth switching line 68, but only to one of them.

For example, the first contact area 20 of a column is electrically connected to the first switching line 44, the second contact area of the column to the third switching line 66, the third contact area 20 of the column to the fourth switching line 68, the fourth contact area 20 of the column then again to the first switching line 44, etc.

In other words, the first column is divided by the three groups of switching lines 44, 66, 68. Each column thus has three groups of switching lines 44, 66, 68.

This can be seen particularly well in FIG. 10, which again shows an equivalent circuit diagram.

For example, in order to activate the switchable contact areas 20 marked with the filled in dots in FIG. 9, which are contacted by the vehicle contact unit 14, a negative voltage is applied to the second switching lines 46 of the rows (m), (m+1), (m+2), (m+3) and (m+4).

In column (n), only one of the switching lines 44, 46, 66, in this case the first switching line 44, is supplied with a positive voltage. In the columns (n+1) and (n+2), all three switching lines 44, 46, 66 are supplied with a positive voltage and in the column (n+3), again only one of the switching lines 44, 46, 66, here again the first switching line 44.

In this way, it is achieved that only those contact areas 20 are activated and thus electrically connected to the assigned potential layer 24 thereof which are contacted by the vehicle contact unit 14.

Figure 13:
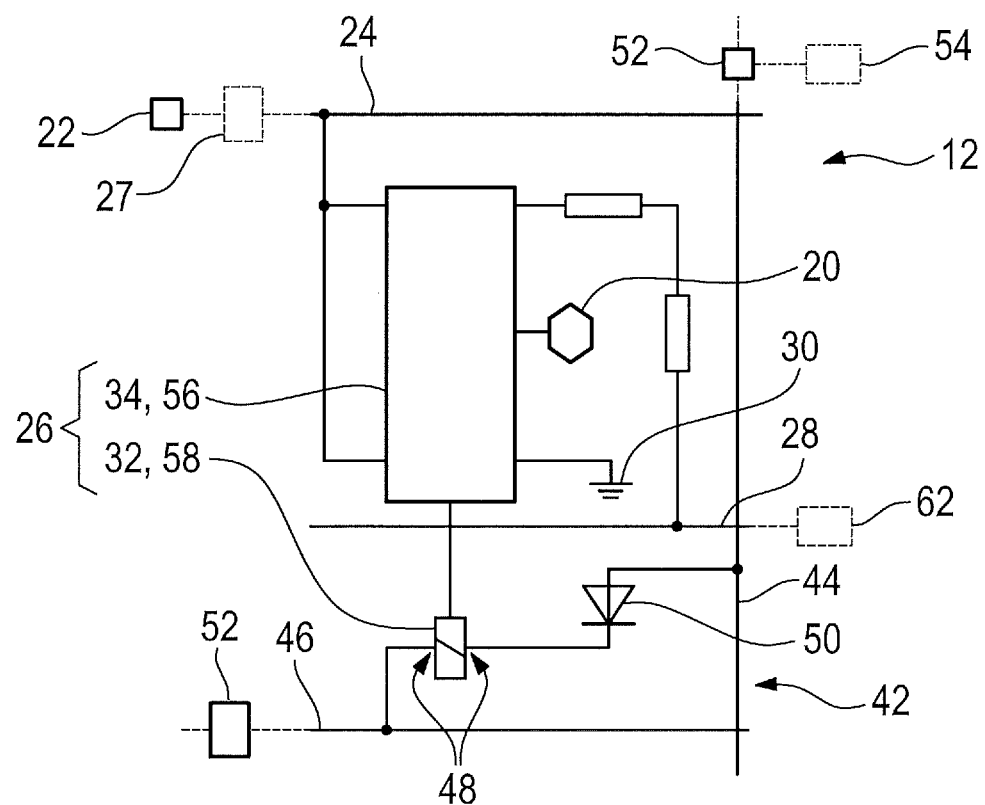

FIG. 13 shows a further embodiment of the ground contact unit 12.

In this embodiment, the switching unit 26 includes an electronic switch 56 and an upstream circuit 58, the electronic switch 56 serving as a switching element 34 and the upstream circuit 58 as an actuating element 32.

The electronic switch 56 is for example a MOSFET or a TRIAC.

The upstream circuit 58 is a logic circuit, for example an AND gate or a NAND gate, which has the switching contacts 48 as inputs. The upstream circuit 58 is therefore electrically connected to the switching lines 44, 46 and if necessary also to the switching lines 66, 68.

The upstream circuit 58 is also electrically connected to the electronic switch 56 for the control thereof.

For this purpose, the upstream circuit 58 outputs a voltage to the electronic switch 56, the electronic switch 56 connecting the contact area 20 to the assigned potential layer 24 if the voltage output by the upstream circuit 58 exceeds a threshold value.

The voltage output by the upstream circuit 58 is dependent on the signals of the switching lines 44, 46, and only exceeds the threshold value, for example, if signals are simultaneously present on both switching lines 44, 46.

The mode of operation of the switching unit 26 composed of the electronic switch 56 and the upstream circuit 58 is therefore the same as that of the switching unit 26 of the embodiments described above.

Via the control line 28, it can also be checked in this embodiment whether the contact area 20 is connected to the assigned potential layer 24 or not. This is done, for example, via a voltage measurement or otherwise. A multiplexer can also be used.

It is also conceivable that the electronic switch 56 switches the contact area 20 between the assigned potential layer 24 and the PE layer 25.

However, the control line 28 can also be omitted as the electronic switch 56 has no moving parts.

In addition, the diode 51 in this embodiment can be omitted.

The features of the described embodiments can of course be combined with each other in any way.

In other words, the embodiments of the disclosure can be described as follows:

A row and column driving is in particular used for enabling the contacts usually exposed on the upper side of the base body (hereinafter: contact areas). The reason is that due to this approach, it is possible to save lines and at the same time to increase safety.

In the following, the control of the contact areas on the base body is explained.

FIG. 4 shows the circuit for relay control and the sense line for a single contact area 20. By switching the disconnector 27 or the main disconnector 29, either L1, L2, L3 or N is present on the corresponding line. The relay must be switched to ensure that the phase or N conductor is actually present on the contact. To switch a relay, the control lines (also called switching lines) of the corresponding column and row are used.

Preferably 24 V or 12 V relays are used. These 24 V or 12 V are achieved by applying +12 V or +6 V, respectively, to the column and −12 V or −6 V, respectively, to the row. Other relays could also be used. The decisive factor is that the required switching voltage is obtained by switching one row and one column, thus increasing safety, as two elements must be switched and thus create an "and" operation.

To detect whether a relay is actually switched, the sense line (also referred to as control line 28) is used. To this end, a test voltage is applied to the sense line, and the measured value changes depending on the number of switched relays per row. In this way, it is possible to determine the number of switched relays per row. Should a relay "get stuck" (e.g. due to a switching operation at high voltage and subsequent welding due to the arc), this can be detected by means of the sense line. Each row has its own sense line.

FIG. 5 shows the circuit diagram for 4 switchable contacts and with intermediate non-switchable PE contacts.

Any switching unit can be used instead of the relays, in particular a triac.

As a further safety function, the maximum number of switchable relays per row and column is limited by a current limit per row and column. This ensures that only the necessary number can be switched per row and column.

FIG. 7 shows the rows and columns (forming a lattice) required to switch the 6 contacts currently required. The rows and columns are formed by corresponding switching lines. The black circle contains the 6 contacts, and these can be switched by the three blue rows and the two red columns without switching a further contact on the pad.

Control Contact Area Large

To switch a relay, an "and condition" is required. If a larger connector (i.e. a vehicle contact unit interface) is to be used (as shown in FIG. 8 by a black circle), this can be achieved in several ways. One possibility is to add a second "and condition". This can be solved as shown in FIG. 8 by adding the second "and condition" by a further control line and switching only those contacts/relays where the three control lines cross. The circuit of FIG. 4 cannot be used for this circuit. A transistor circuit would be suitable.

One way of wiring the larger connector with the circuit of FIG. 4 is to add two control lines to each column and to thus create three groups of control lines per column, and to connect the column lines alternately to the relays in each column (see FIG. 9). FIG. 10 shows the wiring for this system.

A plurality of potential layers also referred to as layers is provided in the plate-like base body below the contact area. The potential layers are in particular configured as layers in a circuit board.

A so-called charging contactor can be provided in the base body or outside the base body in a switch cabinet, by means of which the high currents are then switched on. This means that the corresponding switching unit is usually set to the corresponding switching state before the charging contactor is switched on, and only then the high charging current is switched on via the charging contactor.

Usually, seven potential layers are present by means of which charging can be carried out via three-phase current, alternating current or direct current. FIG. 7 shows that the smallest unit on the contact area is a PE contact and that six contact areas arranged in a hexagon are located therearound, i.e. there is a total of seven contact areas including the PE. Each of these contact areas has its own potential layer. In the embodiment according to FIG. 9, the rows and columns formed by the control lines can also be interchanged. Three switching lines per column are shown. Since usually one transistor is provided per switching line, the electronic components can be reduced by exchanging rows and columns. Depending on the pad size (geometry) and thus the number of rows and columns, it may be useful to exchange rows and columns to save components.

The invention claimed is:

1. A ground contact unit for a vehicle battery charging system for automatic conductive connection of the ground contact unit and a vehicle contact unit, having a plate-shaped base body, at least one potential layer, a plurality of contact areas which are arranged on an exposed charging surface of the base body, on which the vehicle contact unit can come to rest, and which are assigned to at least one potential layer, a plurality of switching units and a plurality of switching lines by means of which the switching units can be actuated, a plurality of switching units being provided on each of the switching lines,
wherein the switching lines are subdivided into at least two groups each having a plurality of switching lines, and each of the switching units is provided on at least two switching lines from at least two different groups, such that the switching state of the switching unit depends on the signal state on its associated switching lines,
wherein each switching unit is coupled to at least one of the contact areas such that the switching unit can electrically connect and interrupt the corresponding at least one contact area to the at least one potential layer assigned to the contact area.

2. The ground contact unit according to claim 1, wherein the at least one potential layer is adapted to be connected to the earth potential, a neutral conductor, an outer conductor, a phase, a positive pole or a negative pole of a current source.

3. The ground contact unit according to claim 1, wherein the switching lines can be supplied with at least one of voltage and current separately from each other.

4. The ground contact unit according to claim 1, wherein the ground contact unit has at least one PE layer, wherein the switching units are set up such that they can electrically connect the contact area assigned thereto either to the potential layer assigned thereto or to the at least one PE layer.

5. The ground contact unit according to claim 1, wherein exactly one of the switching units is provided for each contact area.

6. The ground contact unit according to claim 1, wherein a switching element of the switching unit electrically connects the corresponding at least one contact area to the potential layer assigned thereto when the switching lines assigned to the switching unit are switched appropriately.

7. The ground contact unit according to claim 1, wherein the switching lines on which one of the switching units is provided differ from the switching lines on which another of the switching units is provided in at least one switching line.

8. The ground contact unit according to claim 1, wherein the switching lines of a group run substantially in the same direction.

9. The ground contact unit according to claim 1, wherein that the switching lines form a lattice at the points of intersection of which switching lines of different groups intersect, wherein one switching unit is arranged at each of the points of intersection, preferably wherein the switching unit can be switched only at different potentials on its switching lines.

10. The ground contact unit according to claim 9, wherein the directions of the different groups enclose an angle with each other.

11. The ground contact unit according to claim 1, wherein the switching units each have two switching contacts which are connected to the switching lines.

12. The ground contact unit according to claim 11, wherein two groups of switching lines are provided, wherein one of the switching contacts is connected to a switching line of one group via at least one diode and the other of the switching contacts is connected to a switching line of the other group.

13. The ground contact unit according to claim 12, wherein the switching unit is set up such that it electrically connects the contact area assigned thereto to the potential layer assigned thereto when there is at least a predetermined voltage difference between the switching contacts.

14. The ground contact unit according to claim 1, wherein the ground contact unit has at least one control line and the switching units have a double switch as a switching element, wherein the double switch is configured such that the control line is electrically connected to a determined potential layer, only if the contact area is also connected to the determined potential layer.

15. The ground contact unit according to claim 14, wherein the double switch is configured such that one of the switches of the double switch can electrically connect the control line to the contact area and the other switch of the double switch electrically connects the contact area to the determined potential layer, only if the control line is also electrically connected to the contact area.

16. The ground contact unit according to claim 1, wherein the ground contact unit has a first potential layer, a second potential layer and a third potential layer,
wherein the contact areas assigned to the first potential layer form first contact areas,
wherein the contact areas assigned to the second potential layer form second contact areas,
wherein the contact areas assigned to the third potential layer form third contact areas,
wherein the first contact areas are arranged in a first sublattice in the form of a 2-dimensional Bravais lattice, the second contact areas are arranged in a second sublattice in the form of a 2-dimensional Bravais lattice, and the third contact areas are arranged in a third sublattice in the form of a 2-dimensional Bravais lattice,
wherein the first sublattice, the second sublattice and the third sublattice are nested within each other, and
wherein in the direction of at least one of the basis vectors of the main lattice formed by the contact areas, the first contact areas, the second contact areas and the third contact areas occur alternately.

17. A method of switching a contact area of a ground contact unit to a desired potential,
the ground contact unit comprising a plate-shaped base body, at least one potential layer, a plurality of contact areas which are arranged on an exposed charging surface of the base body, on which the vehicle contact unit can come to rest, and which are assigned to at least one potential layer, a plurality of switching units and a plurality of switching lines by means of which the switching units can be actuated, a plurality of switching units being provided on each of the switching lines,
wherein the switching lines are subdivided into at least two groups each having a plurality of switching lines, and each of the switching units is provided on at least two switching lines from at least two different groups, such that the switching state of the switching unit depends on the signal state on its associated switching lines,
wherein each switching unit is coupled to at least one of the contact areas such that the switching unit can electrically connect and interrupt the corresponding at least one contact area to the at least one potential layer assigned to the contact area,
the method comprising the following steps:
a) applying a predetermined voltage having a predetermined corresponding polarity to the switching lines on which the switching unit assigned to the contact area to be switched is applied, thereby actuating the switching unit so that the contact area is electrically connected to the at least one potential layer assigned to the contact area, and
b) applying the desired potential to the at least one potential layer assigned to the contact area to be switched.

18. The method according to claim 17, wherein a positive voltage is applied to the switching line of one of the groups and a negative voltage is applied to the switching line of the other group.

19. The method according to claim 17, wherein the voltage is determined at the control line, wherein the number of at least one of switched contact areas and non-switched contact areas is deduced from the magnitude of the voltage.

20. The method according to claim 17, wherein the current across one of the switching lines to which the voltage has been applied is limited such that only a predetermined number of switching units can be switched via this switching line.

* * * * *